INVENTOR
AYAO FUKUDA

Dec. 23, 1969  AYAO FUKUDA  3,485,499
AUTOMATIC SPEED CHANGE DEVICE FOR RECORD PLAYERS
Filed Dec. 9, 1966  6 Sheets-Sheet 3

INVENTOR
AYAO FUKUDA
BY Stevens, Davis, Miller & Mosher
ATTORNEY

Dec. 23, 1969   AYAO FUKUDA   3,485,499
AUTOMATIC SPEED CHANGE DEVICE FOR RECORD PLAYERS
Filed Dec. 9, 1966   6 Sheets-Sheet 5

INVENTOR
AYAO FUKUDA

BY Stevens, Davis, Miller & Mosher

ATTORNEY

Dec. 23, 1969          AYAO FUKUDA                    3,485,499
              AUTOMATIC SPEED CHANGE DEVICE FOR RECORD PLAYERS
Filed Dec. 9, 1966                                 6 Sheets-Sheet 6

INVENTOR
AYAO FUKUDA

BY Stevens, Davis, Miller & Mosher

ATTORNEY

United States Patent Office 3,485,499
Patented Dec. 23, 1969

3,485,499
AUTOMATIC SPEED CHANGE DEVICE FOR RECORD PLAYERS
Ayao Fukuda, Daito-shi, Japan, assignor to Matsushita Electric Industrial Co., Ltd., Osaka, Japan, a corporation of Japan
Filed Dec. 9, 1966, Ser. No. 600,522
Claims priority, application Japan, Dec. 14, 1965, 40/78,830; Dec. 17, 1965 (utility model), 40/105,069; Nov. 4, 1966 (utility model), 41/103,102
Int. Cl. G11b 25/04
U.S. Cl. 274—9           8 Claims

ABSTRACT OF THE DISCLOSURE

An automatic speed change device for record players of the type wherein an adapter, used for centering a 45-r.p.m. record disc, is utilized spring biased to an upper position when a 45-r.p.m. record disc is placed on the adapter and depressed to a lower position against the biasing force by the weight of a 33-r.p.m. record disc. A single actuating pin responsive to the adapter switchingly drives an idler changeover mechanism for controlling a motor in response to the position of the adapter whereby a correct turntable speed is developed for the record disc on the turntable.

---

This invention relates to automatic speed change devices for record players, and more particularly to an automatic speed change device of the kind described in which an adapter used for the centering of a 45-r.p.m. record disc is utilized so that this adapter can be controlled to take a plurality of vertical positions depending on the kind of record disc, such as a 33-r.p.m. record disc, 45-r.p.m. record disc or the like, placed on a turntable and in which a single actuating pin provided on the record disc adapter drives an idler change-over mechanism or a switch-over mechanism for an electronically controlled motor for thereby automatically obtaining a predetermined speed at which a particular record disc is adapted to rotate.

In a record player, generally, the number of revolutions of its turntable must be changeable to 78 r.p.m., 45 r.p.m. and 33 r.p.m. in order to permit playing of 78-r.p.m. record discs, 45-r.p.m. record discs, and 33-r.p.m. record discs. However, in view of the recent tendency towards an increasing preference to 45-r.p.m. record discs and 33-r.p.m. record discs, record players having a speed change-over mechanism adapted to give two numbers of revolutions, 45 r.p.m. and 33 r.p.m., can be sufficiently and satisfactorily used in practice.

Speed change-over devices employed in conventional record players have invariably had such a structure that the capstan therein has a plurality of stepwise reduced diameter portions and one of these reduced diameter portions of the capstan is brought into driving contact with an idler which is in pressure contact with the turntable to obtain a desired speed, while a hand operating knob is provided to make all these manipulations.

On the other hand, record players of the kind adapted to make automatic change-over of speed depending on the kind of record discs have also been proposed. The record players of this type are provided with two actuating pins which are arranged to make vertical movement depending on whether a 33-r.p.m. record disc or a 45-r.p.m. record disc is placed on the turntable so that these pins can individually drive associated levers for thereby changing over the position of the idler. Accordingly, this type of record player has required two sets of pins, pin restoring means and levers and has had a complex overall structure.

It is therefore the primary object of the present invention to eliminate the defects involved in the prior speed change devices as described above and to provide a novel and improved speed change device for record players in which an adapter for the centering of a 45-r.p.m. record disc, an actuating pin connected to the adapter, and a change-over plate operative in response to the position of the adapter are provided to easily and positively actuate an idler change-over mechanism or a switch-over mechanism for an electronically controlled motor for thereby automatically obtaining the speed at which a particular record disc is adapted to rotate.

The above and other objects, advantages and features of the present invention will become apparent from the following description with reference to the accompanying drawings, in which.

Figure 1:
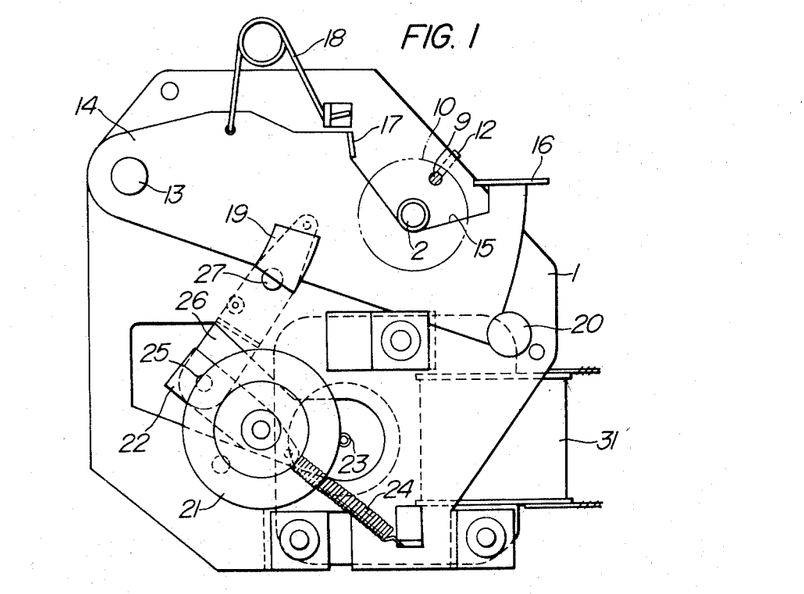
FIG. 1 is a top plan view of an embodiment of the automatic speed change device for record players according to the present invention.
Figure 2:
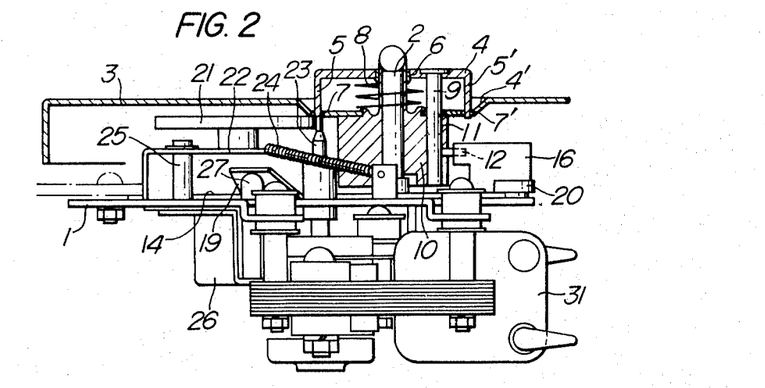
FIG. 2 is a side view of the automatic speed change device shown in FIG. 1.

Referring now to FIGS. 1 to 7, one embodiment of the present invention will be described in detail. The automatic speed change device according to the invention includes a base plate 1 from which a rotary shaft 2 extends upwardly for supporting thereon a turntable 3. The turntable 3 has a central recess 4' for vertically movably receiving therein an adapter 4 used for the centering of a 45-r.p.m. record disc. The adapter 4 is made in the form of a disc and has a pair of guide legs 5 and 5' depending from opposite points on the peripheral edge thereof. A central aperture 6 of the adapter 4 fits on the rotary shaft 2, and the guide legs 5 and 5' freely pass into respective guide holes 7 and 7' formed in the bottom of the central recess 4' of the turntable 3. A coil spring 8 mounted on the rotary shaft 2 normally urges the adapter 4 upwardly so that the adapter 4 takes its upward position in a non-loaded state as shown in FIG. 2 in which the adapter 4 projects upwardly above the upper face of the turntable 3. The adapter 4 is provided with a rod 9 which extends downwardly from the lower face of the disc portion thereof. This rod 9 is received in a bore 11 of a boss 10 firmly fixed to the lower central face of the turntable 3 so as to be vertically movable in this bore 11. The bore 11 of the boss 10 is made in the form of a groove extending outwardly through the outer peripheral edge of the boss 10 so that a pin 12 projecting in a horizontal direction from the lower end of the rod 9 can make free vertical movement together with the rod 9. On the base plate 1 there is provided a change-over plate 14 which is pivotally attached at one end thereof to the base plate 1 by a pivot pin 13 and is swingable in a horizontal plane about the pivot pin 13. A recess 15 is provided on one side of the change-over plate 14 opposite to the rotary shaft 2 and has a first abutment 16 and a second abutment 17 projecting from opposite end edges thereof. These abutments are so positioned and have such a shape that the first abutment 16 comes to a position at which it is engageable with the pin 12 when the adapter 4, and hence the pin 12 connected thereto, takes its upward position, while the second abutment 17 comes to a position at which it is engageable with the pin 12 when the adapter 4, and hence the pin 12 connected thereto, takes its downward position. Furthermore these abutments are so arranged that the first abutment 16 can be positioned in the path of rotary movement of the pin 12 when the change-over plate 14 is in its 33-r.p.m. position, while the second abutment 17 can be positioned in the path of rotary movement of the pin 12 when the change-over plate 14 is in its 45-r.p.m. position.

A V-shaped spring 18 has its one end anchored to the change-over plate 14 so that the change-over plate 14 can make a controlled angular movement between two extremities about the pivot pin 13 by the force of the spring 18 when a force of swinging movement is imparted to the change-over plate 14 to urge it beyond the dead point. A downward force applying member 19 extends in an upwardly inclining relation from the other side of the change-over plate 14. That portion of the change-over plate 14 on the opposite side of the pivot pin 13 is held from upward movement by a swinging movement guide member 20 which also acts as a stopper by abutting the first abutment 16.

Figure 5:
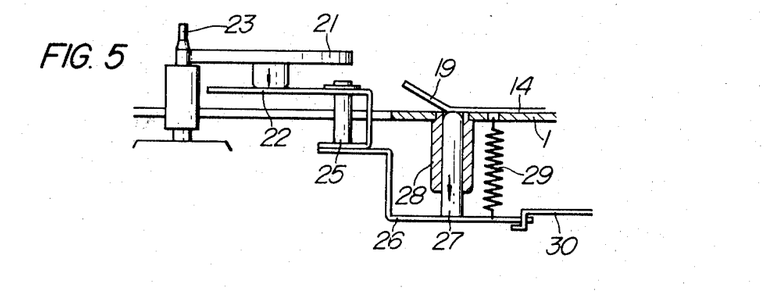
FIG. 5 is a side view showing the relation between an idler and a capstan during playing of a 45-r.p.m. record disc.
Figure 6:
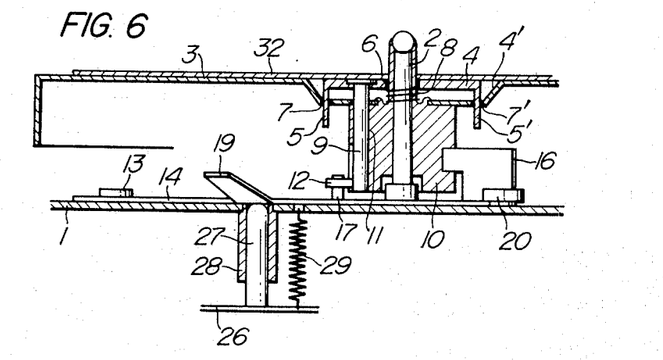
FIG. 6 is a side view showing a state in which the change-over plate and other members in the device are going to operate in response to placing of a 33-r.p.m. record disc on the turntable.
Figure 7:
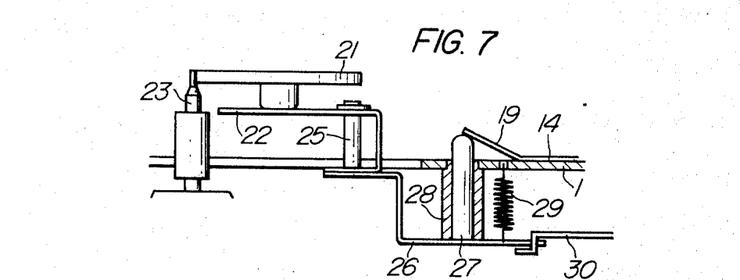
FIG. 7 is a side view showing the relation between the idler and the capstan during playing of a 33-r.p.m. record disc.

An idler 21 which can be urged to its two operative positions is pivotally mounted on a support arm 22 and is forced into peripheral contact by means of a spring 24 with one of a plurality of stepwise different diametered portions of a capstan 23 which extends upwardly through the base plate 1. The support arm 22 is pivoted to another support arm 26 by a pivot pin 25. The support arm 26 is provided with a rod 27 extending upwardly therefrom and having a rounded head. This rod 27 extends upwardly through a guide slot 28 in the base plate 1 and is normally projected above the upper face of the base plate 1 by the force of a coil spring 29. It will be understood that when the change-over plate 14 is swung to a position as shown in FIG. 6, the downward force applying member 19 urges the head of the rod 27 downwardly to cause downward movement of the idler 21. A lever 30 shown in FIGS. 5 and 7 is connected to manual change-over knob (not shown) so as to manually urge the support arm 26 to its off-the-idler position. A drive motor 31 is drivingly connected to the capstan 23.

Figure 3:
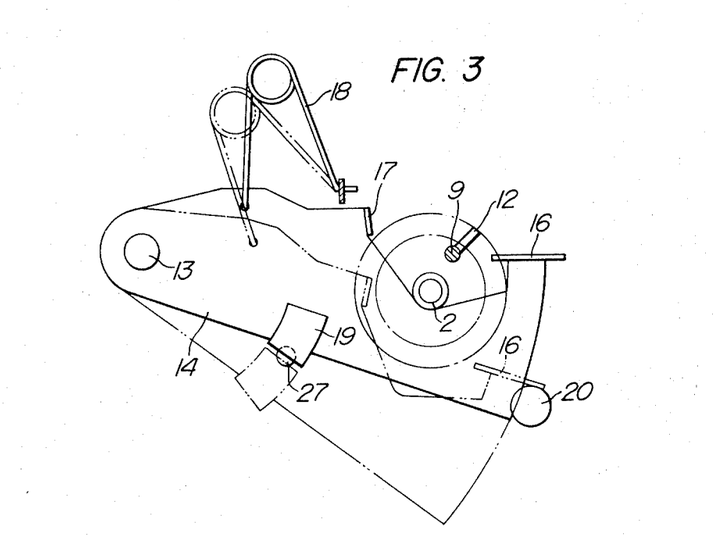
FIG. 3 is a plan view showing the relation between a change-over plate and a record disc adapter in the device.

Now the operation of the device according to the present invention will be described first with regard to a case of playing a 33-r.p.m. record disc. FIG. 1, solid lines in FIG. 3, and FIG. 6 show the state of playing a 33-r.p.m. record disc. When a 33-r.p.m. record disc 32 is placed on the turntable 3 as shown in FIG. 6, the weight of the record disc 32 causes downward movement of the adapter 4 against the force of the spring 8. In such a case, the rod 9 and the pin 12 connected to the adapter 4 also make their downward movement. It will be seen from FIG. 6 that in such a situation the pin 12 is positioned beneath the first abutment 16 and is not engageable with the first abutment, while the second abutment 17 is also positioned outside of the path of rotary movement of the pin 12 as will be apparent from the position of the change-over plate 14 as shown by solid lines in FIG. 3. It is therefore possible to play the 33-r.p.m. record disc 32.

Figure 4:
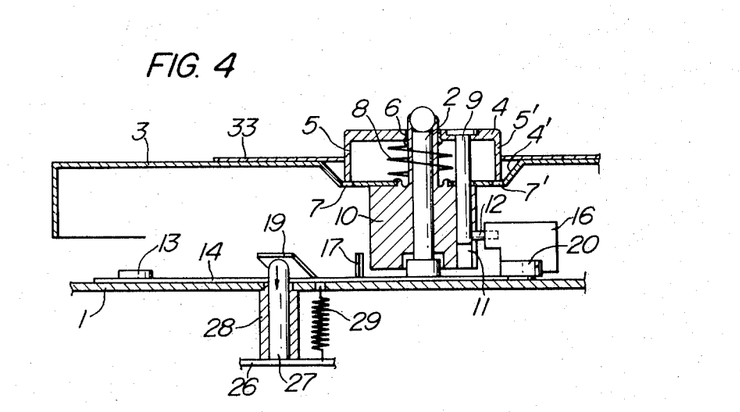
FIG. 4 is a side view showing a state in which the change-over plate and other members in the device are going to operate in response to placing of a 45-r.p.m. record disc on a turntable.

When, at such position of the change-over plate 14, a 45-r.p.m. record disc 33 is placed on the turntable 3 as shown in FIG. 4, the adapter 4 is urged upwardly through the central aperture of the record disc 33 by the force of the spring 8 owing to the fact that this record disc 33 has a doughnut-like shape. The upward movement of the adapter 4 is accompanied by the upward movement of the rod 9 and the pin 12, and the pin 12 comes to a position at which it is engageable with the first abutment 16. Accordingly the pin 12 rotating integrally with the turntable 3 forces the first abutment 16 clockwise in FIG. 3 since the first abutment 16 is now positioned in the path of rotary movement of the pin 12. This operation causes a clockwise swinging movement of the change-over plate 14 about the pivot pin 13 so that the change-over plate 14 is swung by the snap action of the spring 18 to a position, as shown by dotted lines in FIG. 3, at which the first abutment 16 is abutted by the swinging movement guide member 20 and is held from further movement. By such swinging movement of the change-over plate 14, the downward force applying member 19 integral with the plate 14 forces downwardly the head of the rod 27 provided on the support arm 26 for the idler 21 as shown in FIG. 5, with the result that the support arm 26 makes a downward movement against the force of the spring 29. As a result, the idler 21 operatively connected to the support arm 26 also makes a downward movement to be brought into peripheral contact with the lower large diameter portion of the capstan 23 so that the speed is automatically changed over to 45 r.p.m. In this case, the pin 12 adapted for movement in integral relation with the adapter 4 is not engageable with the first abutment 16 due to the fact that the latter moves outside of the path of rotary movement of the pin 12, while the pin 12 is positioned above the second abutment 17 and there is no interengageable relation therebetween. Therefore it is possible to play the 45-r.p.m. record disc 33.

Then when, from the state as shown in FIG. 4 for playing the 45-r.p.m. record disc, a 33-r.p.m. record disc 32 is re-placed on the turntable 3, the adapter 4 is again urged downwardly by the weight of the record disc 32 as shown in FIG. 6. The rod 9 and the pin 12 also make their downward movement so that the pin 12 is brought to a position at which it is engageable with the second abutment 17. Since in this case the second abutment 17 is in the path of rotary movement of the pin 12 as shown by dotted lines in FIG. 3, rotation of the turntable 3 and integral rotary movement of the pin 12 result in that the pin 12 forces the second abutment 17 counter-clockwise for thereby urging the change-over plate 14 counter-clockwise so that the plate 14 takes the position as shown by solid lines in FIG. 3 and is changed over to the state as shown in FIGS. 1 and 4. At such position of the change-over plate 14, downward pressure on the rod 27 at the member 19 is released and the idler 21 moves upwardly to make peripheral contact with the upper small diameter portion of the capstan 23 so that the speed can be automatically changed over to 33 r.p.m.

Figure 8:
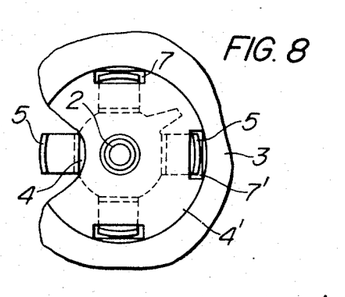
FIG. 8 is a top plan view of a modified form of the record disc adapter.
Figure 9:
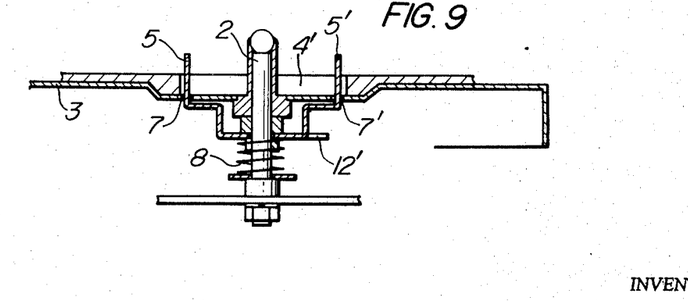
FIG. 9 is a sectional side view of the record disc adapter in FIG. 8.
Figure 10:
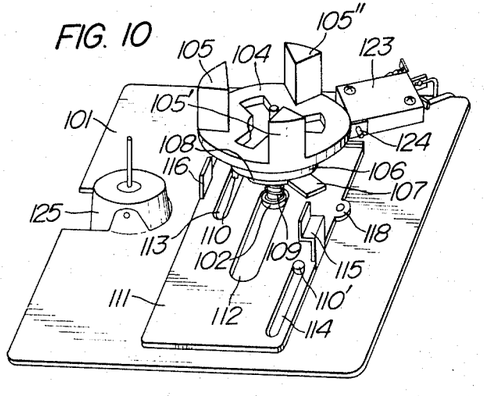
FIG. 10 is a perspective view of another embodiment of the automatic speed change device for record players according to the present invention.

A modified form of the adapter 4 is shown in FIGS. 8 and 9. As a matter of fact, this modified type of adapter 4 is an upside-down modification of the adapter 4 described previously. More precisely, this adapter 4 has a plurality of upwardly extending guide members 5, 5' ... which extend through a plurality of guide holes 7, 7' ... on the turntable 3 from therebelow and project above the upper face of the turntable 3. These guide members 5, 5' ... are each shaped in the form of an arc and are arranged to lie along the inner periphery of the central aperture of a 45-r.p.m. record disc 33 for the proper centering of the latter. Further the previous pin 12 for actuating the change-over plate 14 is replaced by a lug 12' horizontally projecting from the lower part of the adapter 4. In the device provided with this type of adapter 4, the previous rod 9 for guiding the vertical movement of the adapter 4 can be eliminated.

It will be appreciated that in the automatic speed change device for record players according to the invention, a record disc adapter which is forced to its downward position by the placement of a 33-r.p.m. record disc and remains in its upward position in case of a 45-r.p.m. record disc is utilized to act as a record disc selector and thus provision of any extra selector on the turntable can be obviated. Since moreover the speed change-over operation in the device of the invention is such that a single pin making vertical movement with the adapter selects one of two abutments on a change-over plate and the rotation of the pin in integral relation with the turntable actuates the change-over plate, there is utterly no necessity of provision of a plurality of detectors and levers interconnected therewith which have been indispensable in prior record players, and thus the device can have a simplified structure. Furthermore, the inventive device is advantageous in its ease of design because the two abutments on the change-over plate may merely be provided at such positions at which they can be alternately brought opposite to two positions, that is, the upward and downward positions of the pin and the interengageable relation therebetween may merely be controlled by the swinging movement of the change-over plate in a horizontal plane. Still further, the operation of the change-over plate is simplified since the change-over plate may merely be constructed to make swinging movement about a pivot pin. The manner of operation of the inventive device in which the swinging movement of the change-over plate applies pressure to or releases pressure from a vertically movable rod for directly causing vertical movement of the idler for selective contact with the capstan eliminates the necessity of provision of cam means or a plurality of lever systems and ensures positive and automatic speed change in record players.

Another embodiment according to the present invention will next be described with reference to FIGS. 10 to 14. The automatic speed change device shown in FIGS. 10 to 14 includes a generally flat base plate 101 from which a rotary shaft 102 extends upwardly for supporting thereon a turntable 103. The turntable 103 has a plurality of spaced holes 104' at its central portion for vertically movably receiving therein guide extensions 105, 105' and 105" of an adapter 104 used for the centering of a 45-r.p.m. record disc. The adapter 104 is made in the form of a disc, and the guide extensions 105, 105' and 105" are provided on its outer peripheral portions in equally circumferentially spaced relation to each other. The adapter 104 also has a depending sleeve 106 extending downwardly from the central portion thereof. The rotary shaft 102 extends through the central hole of the sleeve 106 for integral rotation with the adapter 104. An actuating plate 108 having a pin 107 at one end thereof firmly fixed to the lower face of the sleeve 106 and operative in integral relation with the adapter 104. A coil spring 109 mounted on the rotary shaft 102 near the lower end of the latter engages the lower face of the actuating plate 108 to normally urge the actuating plate 108, and hence the adapter 104, upwardly.

A change-over plate 111 is disposed on the base plate 101 and is slidable on the upper face of the base plate 101 by being guided by the lower end of the rotary shaft 102 and two guide pins 110 and 110'. To permit the sliding movement of the change-over plate 111 by the guiding action of the lower end of the rotary shaft 102 and the two guide pins 110 and 110', the change-over plate 111 is provided with three elongated slots 112, 113 and 114. A first abutment 115 and a second abutment 116 extend upwardly from one side and the opposite side respectively of the change-over plate 111 as shown. These abutments are so positioned and have such a shape that the first abutment 115 comes to a position at which it is engageable with the pin 107 of the actuating plate 108 when the adapter 104, and hence the pin 107 connected thereto, takes its upward position, while the second abutment 116 comes to a position at which it is engageable with the pin 107 when the adapter 104, and hence the pin 107 connected thereto, takes its downward position. Furthermore these abutments are so arranged that the first abutment 115 can be positioned in the path of rotary movement of the pin 107 when the change-over plate 111 is in its 33-r.p.m. position, while the second abutment 116 can be positioned in the path of rotary movement of the pin 107 when the change-over plate 111 is in its 45-r.p.m. position.

Figure 13:
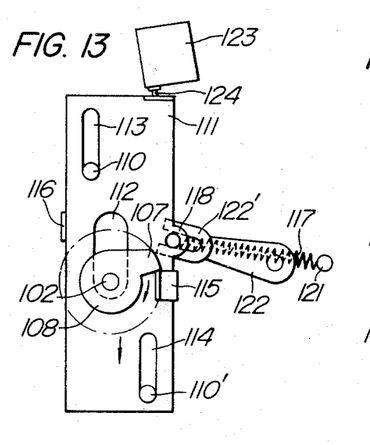
FIG. 13 is a top plan view of parts of the device in the operating position shown in FIG. 11.
Figure 14:
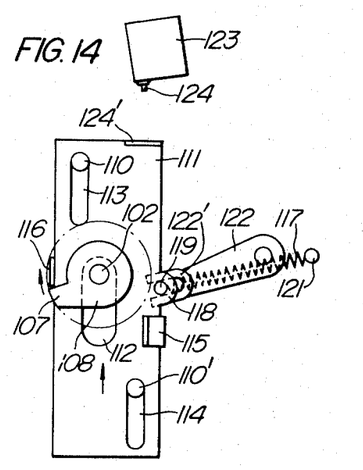
FIG. 14 is a top plan view of parts of the device in the operating position shown in FIG. 12.

A coil spring 117 is disposed beneath the changeover plate 111 in order to assist sliding movement of the latter between its 33-r.p.m. and 45-r.p.m. positions. An engaging pin 119 depending from a lug 118 provided on that side of the change-over plate 111 at which the first abutment 115 is provided extends downwardly through a slot 120 formed on the base plate 101 so that the coil spring 117 can be anchored under tension between the lower end of the pin 119 and a projection 121 depending from the lower face of the base plate 101. A drive member 122 is pivoted at one end thereof to the lower face of the base plate 101 for swinging movement about the pivot point and has the other end thereof shaped in a substantially U-like form as at 122' which is fitted on the engaging pin 119 so that the combined action of the drive member 122 and the coil spring 117 can cause the sliding movement of the change-over plate 111 between the two extremities, that is, the 33-r.p.m. position and the 45-r.p.m. position as best shown in FIGS. 13 and 14.

A switch actuating member 124' is provided at one end of the change-over plate 111 in order to depress a push button 124 of a change-over switch 123 mounted on the base plate 101. The switch 123 is electrically connected to an electronically controlled motor 125 for automatically controlling the number of revolutions of the motor 125 in response to the change-over of the switch 123. The motor 125 is disposed on a part of the base plate 101 and is normally urged in a predetermined direction by a spring 126.

Figure 15:
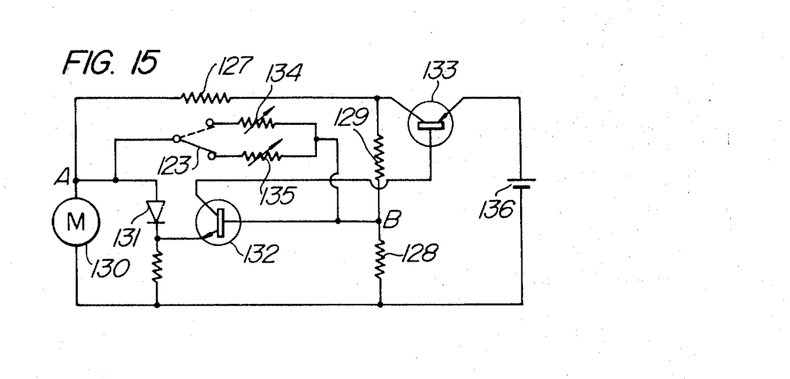
FIG. 15 is an electric circuit diagram of an electronically controlled motor used in the device of FIG. 10.
Figure 16:
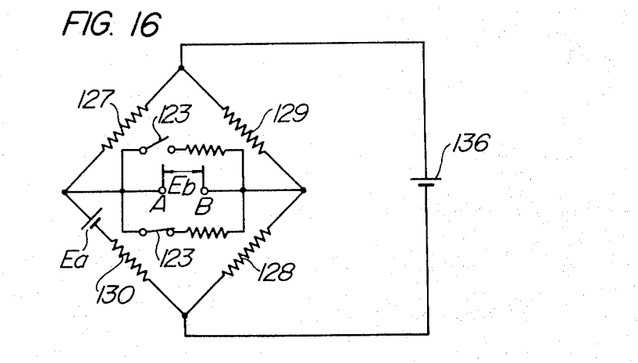
FIG. 16 is an equivalent circuit diagram of the circuit shown in FIG. 15.

An electric circuit diagram and an equivalent circuit diagram of this electronically controlled motor 125 are shown in FIGS. 15 and 16, respectively. It will be seen in FIG. 15 that the circuit includes fixed resistors 127, 128 and 129, a motor 130, a diode 131, a voltage amplifying transistor 132, a power control transistor 133, shunt resistances 134 and 135 for the purpose of obtaining the respective numbers of revolutions of 45-r.p.m. and 33-r.p.m., a power supply battery 136 and the switch 123 for changing over the circuit for obtaining either 45-r.p.m. or 33-r.p.m. The shunt resistances 134 and 135 are of semi-fixed type and this type is employed in order that fine adjustment can be made for the proper setting of the above numbers of revolutions.

The operating principle of the electronically controlled motor 125 will be described hereunder with reference to FIGS. 15 and 16. The motor 130, as it rotates, generates a counter electromotive force $Ea$ proportional to its number of revolutions. The motor 130 constitutes a bridge circuit together with the fixed resistors 127, 128 and 129 as shown in FIG. 16, and a voltage Eb proportional to the speed of the motor 130 appears across detecting terminals A and B when the bridge circuit is balanced. The diode 131 permits flow of forward current and acts as a constant voltage element to establish a reference voltage. The voltage amplifying transistor 132 is operative to amplify the voltage differential between the reference voltage and the detected voltage Eb to thereby drive the power control transistor 133. Since the detected voltage Eb appearing across the detecting terminals A and B is variable depending on variation of the shunt resistances 134 and 135, the values of these shunt resistances 134 and 135 may be suitably selected so that the motor 130 can drive the turntable 103 at 45-r.p.m. or 33-r.p.m. Therefore the desired change-over between the numbers of revolutions can be easily effected by changing over the shunt resistances 134 and 135 by the switch 123. The electronically controlled motor 125 has a rotary shaft 137 which is in pressure contact with a frictionally engaging peripheral edge 138 of the inner bottom portion of the turntable 103 to transmit the rotary force to the turntable 103.

Figure 11:
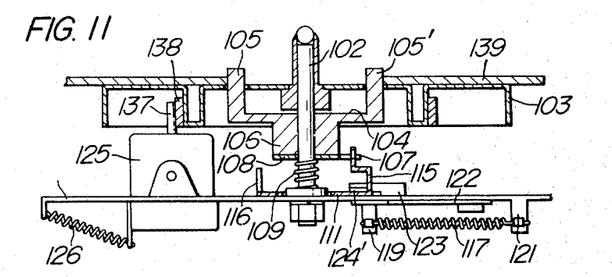
FIG. 11 is a sectional side view of the device of FIG. 10 in its one operating position.

The operation of the second embodiment according to the present invention will be described first with regard to a case of playing a 45-r.p.m. record disc. FIGS. 11 and 13 show a state in which a 45-r.p.m. record disc can be played. More precisely, when a 45-r.p.m. record disc 139 is placed on the turntable 103 as shown in FIG. 11, the adapter 104 remains in its upward position at which it projects through the central aperture of the record disc 139 by the force of the spring 109 owing to the fact that this record disc 139 has a doughnut-like shape. Therefore the pin 107 of the actuating plate 108 is in its upward position at which it is engageable with the first abutment 115, and the pin 107 rotating integrally with the turnable 103 urges in a direction of arrow in FIG. 13 the first abutment 115 positioned in the path of rotary movement of the pin 107 if the change-over plate 111 has been first set at its 33-r.p.m. position. The above operation causes the sliding movement of the change-over plate 111 by being guided by the guide pins 110 and 110' and the coil spring 117 accelerates the sliding movement of the change-over plate 111 towards its 45-r.p.m. position as shown in FIG. 13. By such movement of the change-over plate 111, the push button 124 of the change-over switch 123 is allowed to project to change-over the speed to 45-r.p.m. and thus the electronically controlled motor 125 drives the turntable 103 at the speed of 45-r.p.m.

Figure 12:
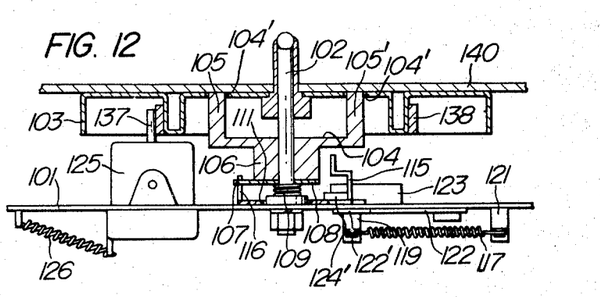
FIG. 12 is a sectional side view of the device of FIG. 10 in its other operating operating position.

The case of 33-r.p.m. will next be described with reference to FIGS. 12 and 14. When a 33-r.p.m. record disc 140 is placed on the turntable 103 as shown in FIG. 12, the guide extensions 105, 105' and 105'' of the adapter 104 are forced downwardly by the weight of the record disc 140 against the force of the spring 109. This downward movement of the adapter 104 is accompanied by the downward movement of the actuating plate 108 fixed to the lower face of the sleeve 106 of the adapter 104, with the result that the pin 107 comes to a position beneath the first abutment 115 at which it is no more engageable with the first abutment 115 and it is now engageable with the second abutment 116. Because of the fact that the second abutment 116 is now positioned in the path of rotary movement of the pin 107 and the guide extensions 105, 105' and 105'' are engaged with the holes 104' of the turntable 103, rotation of the turntable 103 causes the rotation of the pin 107 which urges the second abutment 116 in a direction of arrow in FIG. 14 so that the change-over plate 111 makes sliding movement in the same direction by being guided by the guide pins 110 and 110'. The coil spring 117 accelerates the sliding movement of the change-over plate 111 towards its 33-r.p.m. position as shown in FIG. 14 so that the switch actuating member 124' forces the push button 124 into the change-over switch 123. The change-over switch thereby changes over the speed of the electronically controlled motor 125 which therefore drives the turntable 103 at the speed of 33 r.p.m.

It will be understood from the foregoing description with regard to the second embodiment of the invention that the invention provides an automatic speed change device for record players which includes an adapter which is urged to its downward position in response to the placing of a 33-r.p.m. record disc and remains in its upward position in case of placing of a 45-r.p.m. record disc, an actuating plate fixed to the adapter for integral rotation with the turntable and having a pin projecting therefrom, a change-over plate mounted on a base plate and adapted to make sliding movement between two extremities on the surface of the base plate by the action of guide pins and a spring, a first abutment provided on the change-over plate so that it is engageable with the pin at the upward position of the actuating plate, a second abutment also provided on the change-over plate so that it is engageable with the pin at the downward position of the actuating plate, a change-over switch electrically connected to an electronically controlled motor, and a switch actuating member provided on the changeover plate to effect change-over of the change-over switch. By virtue of the above structure, the number of revolutions suitable for a particular record disc can be automatically obtained by merely placing such record disc on the turntable. Moreover the device according to the invention can positively operate by virtue of its unique structure that the pin of the actuating plate fixed to the adapter making vertical movement in response to placing of a record disc is operative to select either of the two abutments and the rotary movement of the pin in integral relation with the turntable actuates the change-over plate for thereby changing over the change-over switch electrically connected to the electronically controlled motor to change over the number of revolutions of the motor. Furthermore the present embodiment does not require provision of a plurality of detectors and levers, an idler and a capstan and thus has a simplified structure which leads to extreme ease of manufacture and a low manufacturing cost in addition to an advantage of positive power transmission. It will be understood that the automatic speed change device having such features has many other advantages including ease of design and a small overall size.

In summary, the following notable effects can be provided by the present invention:

(1) The kind of a record disc can be automatically detected by mere placement of such record disc and the number of revolutions suitable for the record disc can be automatically obtained.

(2) The automatic speed change device has a simple structure and can be easily designed.

(3) The device can positively and accurately operate by virtue of its simple structure.

(4) The positive operation of the device ensures trouble-free performance of its component parts and hence a long service life.

(5) It may be considered expedient to directly control a contact strip of the switch by the adapter by the utilization of the vertical movement of the adapter. However the provision of the self-holding type of change-over mechanism is more advantageous in that it ensures the stability and positiveness of the make-break operation of the switch contact or the holding state of the switch contact after its operation, eliminates generation of noises, completely obviates such trouble whereby the resiliency of the switch contact strip might impart non-uniform rotation to a record disc when the weight of the record disc is utilized to apply a contact closing force to the switch contact, and also entirely eliminates the possibility of imparting a large degree of limitation to the resiliency of the switch contact strip. Thus the inventive structure is quite suitable for practical use.

(6) A small overall size and a low manufacturing cost can be obtained by virtue of the simple structure.

Figure 17:
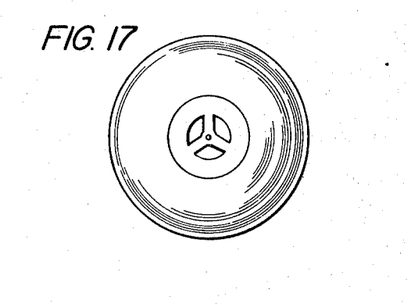
FIG. 17 is a perspective view of a 45-r.p.m. record disc of the kind having the same central aperture as that of a 33-r.p.m. record disc.

(7) By shaping of the adapter in a manner as described in the appended claim 8, the device can also select the proper number of revolutions without any erroneous behaviour for a 45-r.p.m. record disc of special type as shown in FIG. 17 which has the same central aperture as that of a 33-r.p.m. record disc.

What I claim is:

1. An automatic speed change device for record players comprising a turntable having a driving motor, a rotary shaft extending upwardly through a central perforation of said turntable and having a diameter mating with the diameter of the central aperture of a 33-r.p.m. record disc, a record disc adapter surrounding said rotary shaft in coaxial relation therewith and vertically movably disposed on said shaft between upward and downward positions so that said adapter is retracted to its downward position in response to placement of the central aperture of a 33-r.p.m. record disc about said rotary shaft and on said turntable and remains in its upward position projecting through the central aperture of a 45-r.p.m. record disc when such record disc is placed on said turntable, change-over means including two distinct portions below the turntable, one portion of said change-over means being rotatable with the turntable and vertically movable between upward and downward actuating positions in response to movement of the adapter between its upward and downward positions, and the other portion of said change-over means being horizontally movable beteen first and second speed change positions determined by the position of the one portion and in response to rotation of the turntable, and speed change means operative in response to the movement of said other portion of the changeover means to either one of said first and second speed change positions to be changed over to one of two turntable speed positions for thereby automatically changing the speed of said turntable.

2. An automatic speed change device for record players according to claim 1, said one portion of the change-over means comprising an actuating pin connected to said adapter in such a manner that said pin projects in a horizontal direction beneath the turntable and is rotatable in integral relation with said turntable, said actuating pin being urged to change its upward and downward positions in integral relation with the vertical movement of said adapter whereby said pin engages with said other portion of the change-over means to effect selection of one of two turntable operating speeds.

3. An automatic speed change device for record players according to claim 2 in which said other portion of the change-over means comprises a change-over plate disposed on a base plate so as to be slidable between its first and second speed change positions, snap-acting spring means acting to position said change-over plate in either one of said two speed change positions, a first abutment provided on said change-over plate at such a position that it is engageable with said actuating pin when said pin is in its upward position and said change-over plate is in its first speed change position, and a second abutment provided on said change-over plate at such a position that it is engageable with said actuating pin when said pin is in its downward position and said change-over plate is in its second speed change position, said two abutments being selectively driven by the rotational force of said actuating pin whose rotation is responsive to that of said turntable.

4. An automatic speed change device for record players according to claim 3, in which said change-over plate further comprises an upwardly inclining member forming an integral part thereof, support arm means having a vertical rod on one end and an idler on the other end, said upwardly inclining member disengageably engaging the head of said vertical rod for causing a controlled vertical movement of the latter, a capstan having a plurality of stepwise reduced diameter portions, said idler being urged to peripherally engage with one of the step-wise reduced diameter portions of said capstan for thereby changing the rotating speed of said turntable.

5. An automatic speed change device for record players according to claim 3 further comprising electronic control means for said turntable motor including switch means, a switch actuating member provided on part of said change-over plate whereby movement of said switch actuating member, resulting from the sliding movement of said change-over plate, effects change over control of said switch means for controlling transmission of rotary power to said turntable by said motor.

6. An automatic speed change device for record players according to claim 3, in which said change-over plate is pivoted at one end thereof to the base plate by a pivot pin so that the operation of said actuating pin can cause a swinging movement of said change-over plate in a plane.

7. An automatic speed change device for record players according to claim 3, in which said change-over plate comprises at least two elongated slots for losely receiving therein guide pins so that the operation of said actuating pin can cause a straight and reciprocating sliding movement of said change-over plate by being guided by said guide pins.

8. An automatic speed change device for record players according to claim 2, in which said adapter comprises a base portion having a peripheral shape mating with the central aperture of a 45-r.p.m. record disc and a plurality of projections extending upwardly from said base portion and each projection having an arcuate outer peripheral face.

References Cited

UNITED STATES PATENTS

| | | | |
|---|---|---|---|
| 3,220,735 | 11/1965 | Bengin | 274—9 |
| 3,162,448 | 12/1964 | Hartman | 274—9 |

LEONARD FORMAN, Primary Examiner

ROGER A. FIELDS, Assistant Examiner